(12) United States Patent
Sasaki et al.

(10) Patent No.: US 10,360,475 B2
(45) Date of Patent: Jul. 23, 2019

(54) OBJECT RECOGNITION APPARATUS

(71) Applicant: TOSHIBA TEC KABUSHIKI KAISHA, Tokyo (JP)

(72) Inventors: Yuta Sasaki, Shizuoka (JP); Hitoshi Iizaka, Shizuoka (JP); Hidehiko Miyakoshi, Shizuoka (JP); Hidehiro Naitou, Shizuoka (JP); Yuichiro Hatanaka, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 15/684,809

(22) Filed: Aug. 23, 2017

(65) Prior Publication Data
US 2018/0060693 A1 Mar. 1, 2018

(30) Foreign Application Priority Data

Aug. 26, 2016 (JP) .................................. 2016-165997

(51) Int. Cl.
G06K 9/62 (2006.01)
G07G 1/00 (2006.01)
(Continued)

(52) U.S. Cl.
CPC ....... *G06K 9/6212* (2013.01); *G06Q 30/0641* (2013.01); *G06T 7/33* (2017.01);
(Continued)

(58) Field of Classification Search
CPC ............. G07G 1/0063; G06K 2209/17; G06K 2209/03; G06K 9/6202; G06K 9/6212;
(Continued)

(56) References Cited

U.S. PATENT DOCUMENTS 9,042,660 B2 5/2015 Naito et al.
2014/0219512 A1* 8/2014 Sasaki ................ G06K 9/00671
382/110

(Continued)

OTHER PUBLICATIONS

Extended European Search Report dated Nov. 22, 2017 in corresponding European Patent Application No. 17187753.3 (Publication No. EP 3287981 A1), 7 pages.

*Primary Examiner* — Kenny A Cese
(74) *Attorney, Agent, or Firm* — Kim & Stewart LLP

(57) ABSTRACT

An object recognition apparatus includes an image capturing unit, a storage unit that stores feature data of a plurality of reference objects, a display unit, and a processor. The processor calculates degrees of similarity between an object in the captured image and a plurality of reference objects, based on the feature data of the reference objects, selects some of the reference objects as candidates objects based on the calculated degrees of similarity, and controls the display unit to display the candidate objects and a message to select one of the candidate objects. If no candidate object is selected within a predetermined time after the candidate objects and the message have been displayed, and thereafter a new image is captured by the image capturing unit, the processor removes the message and calculates degrees of similarity between an object in the newly captured image and the plurality of reference objects.

12 Claims, 13 Drawing Sheets

(51) Int. Cl.
*G06Q 30/06* (2012.01)
*G06T 7/33* (2017.01)

(52) U.S. Cl.
CPC ......... *G07G 1/0063* (2013.01); *G06K 9/6215* (2013.01); *G06K 2209/03* (2013.01)

(58) Field of Classification Search
CPC ............. G06K 9/6215; G06Q 30/0641; G06Q 30/0643; G06T 7/33
See application file for complete search history.

(56) References Cited

U.S. PATENT DOCUMENTS

| | | |
|---|---|---|
| 2015/0023548 A1 | 1/2015 | Fukuda |
| 2015/0139493 A1* | 5/2015 | Takeno .............. G06K 9/00912 |
| | | 382/103 |
| 2016/0275363 A1* | 9/2016 | Matsuzaki ........... G07G 1/0063 |

* cited by examiner

FIG. 3

| MERCHANDISE ID | MERCHANDISE CLASSIFICATION | MERCHANDISE NAME | UNIT PRICE | MERCHANDISE IMAGE | FEATURE DATA |
|---|---|---|---|---|---|
| XXXXXXX1 | 1 | MERCHANDISE A | 200 YEN | MERCHANDISE A IMAGE | ... |
| XXXXXXX2 | 2 | MERCHANDISE B | 500 YEN | MERCHANDISE B IMAGE | ... |
| XXXXXXX3 | 3 | MERCHANDISE C | 90 YEN | MERCHANDISE C IMAGE | ... |
| XXXXXXX4 | 2 | MERCHANDISE D | 100 YEN | MERCHANDISE D IMAGE | ... |
| ⋮ | ⋮ | ⋮ | ⋮ | ⋮ | ⋮ |
| XXXXX101 | 1 | MERCHANDISE Z | 200 YEN | MERCHANDISE Z IMAGE | ... |
| ⋮ | ⋮ | ⋮ | ⋮ | ⋮ | ⋮ |

OBJECT RECOGNITION APPARATUS

CROSS-REFERENCE TO RELATED APPLICATION

This application is based upon and claims the benefit of priority from Japanese Patent Application No. 2016-165997, filed Aug. 26, 2016, the entire contents of which are incorporated herein by reference.

FIELD

Embodiments described herein relate generally to an information processing apparatus and a program.

BACKGROUND

In the related art, a generic object recognition technique may be used for recognizing an article such as merchandise by extracting feature data indicating features of the article from image data obtained by capturing the article, and comparing the extracted feature data with feature data indicating features of a reference article stored in advance. In addition, a check-out system may use the object recognition technique for identifying articles which are sold at a store, and the identified article is sales-registered. An information processing apparatus used for the check-out system executes a generic object recognition processing, calculates degrees of similarity by comparing feature data of an article obtained from image data of the article which is captured with feature data of reference articles stored in advance, and identifies one reference article having a high degree of similarity.

In addition, if the captured article cannot be identified as one reference article, a plurality of reference articles are extracted and displayed as candidates. An operator extracts a reference article matching with the captured article from the reference articles displayed as the candidates.

However, an article which is captured may not be included in the reference articles displayed as the candidates. For example, the operator may have captured an article which is not intended to be captured (for example, arms, clothes, decorations or the like of the operator). In such a case, it is necessary for the operator to operate, for example, a cancel button to cancel the displayed reference articles, and then execute the generic article recognition processing by capturing the intended article.

DESCRIPTION OF THE DRAWINGS

FIG. 3 is an example of a merchandise master table provided in the merchandise reading apparatus.

DETAILED DESCRIPTION

Embodiments provide an information processing apparatus and a program which are capable of automatically resuming a generic object recognition processing with respect to an article which is newly captured in a case in which an article of interest is not included in reference articles displayed as candidates.

In general, according to one embodiment, an object recognition apparatus includes an image capturing unit, a storage unit that stores feature data of a plurality of reference objects, a display unit, and a processor. The processor is configured to calculate degrees of similarity between an object in the captured image and a plurality of reference objects, based on the feature data of the reference objects, select some of the reference objects as candidates objects based on the calculated degrees of similarity, and control the display unit to display the candidate objects and a message to select one of the candidate objects. If no candidate object displayed on the display unit is selected within a predetermined time after the candidate objects and the message have been displayed on the display unit, and thereafter a new image is captured by the image capturing unit, the processor removes the message and calculates degrees of similarity between an object in the newly captured image and the plurality of reference objects, based on the feature data of the reference objects.

Hereinafter, with reference to FIG. 1 to FIG. 13, the information processing apparatus and program will be described in detail according to the embodiment. In the embodiment, a merchandise reading apparatus will be described as an example of an information processing apparatus. In addition, in the embodiment, a merchandise item will be described as an example of an article. The exemplary embodiment is not limited to the embodiment to be described later.

Figure 1:
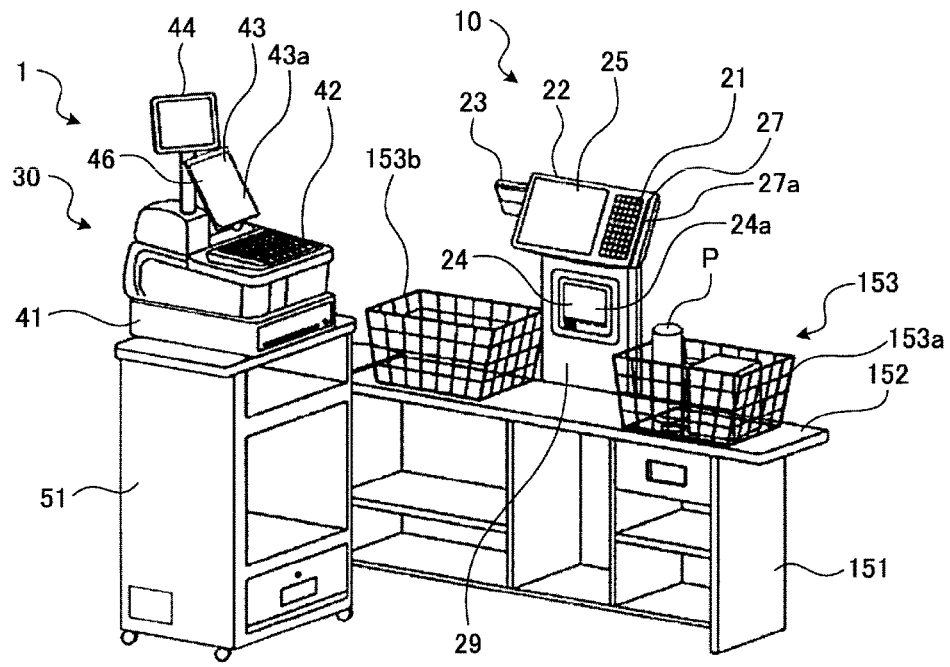
FIG. 1 is a perspective view showing an example configuration of a check-out system including a merchandise reading apparatus according to an embodiment.

FIG. 1 is a perspective view showing an example configuration of a check-out system 1 according to the embodiment. The check-out system 1 is a system for executing a sales registration processing or a payment processing by inputting merchandise information of the merchandise to be sold, which is provided at a retail shop such as a supermarket or a convenience store. As illustrated in FIG. 1, the check-out system 1 includes the merchandise reading apparatus 10 and a POS terminal 30.

The POS terminal 30 is provided on a counter table 151, which has a horizontal elongated shape. The merchandise reading apparatus 10 is connected to the POS terminal 30 for communicating data. The merchandise reading apparatus 10 includes a housing 29.

In the merchandise reading apparatus 10, a reading window 24a of an image capturing unit 24 is provided in a front surface of the housing 29. A card reader 27, which includes an operator display unit 22, a customer display unit 23, an operation panel 21, and a groove 27a, is provided on an upper side of the housing 29. A touch panel 25 is provided on the operator display unit 22. The operation panel 21 includes a temporary settlement key 211 (refer to FIG. 2) which declares finishing of a processing in the merchandise reading apparatus 10.

The counter table 151 includes a load receiving surface 152. A shopping basket 153 for storing the merchandise P is placed on the load receiving surface 152. As the shopping basket 153, there may be a first shopping basket 153a being brought by a customer, and a second shopping basket 153b which is placed at a position so that the merchandise reading apparatus 10 is situated between the first shopping basket 153a and the second shopping basket.

The merchandise P which is purchased by the customer is stored in the first shopping basket 153a. An operator which operates the merchandise reading apparatus 10 takes out the merchandise P from the first shopping basket 153a and moves the merchandise into the second shopping basket 153b. The second shopping basket 153b including the moved merchandise P therein is moved to a location, which is not shown, where the customer bags the merchandise. The customer moves the merchandise P in the second shopping basket 153b into a shopping bag at the location where the customer bags the merchandise.

The merchandise P passes through a front of the reading window 24a of the merchandise reading apparatus 10 when the merchandise P is moved from the first shopping basket 153a to the second shopping basket 153b. At this time, the merchandise reading apparatus 10 captures an image including the merchandise P using the image capturing unit 24 (refer to FIG. 2) disposed behind the reading window 24a. Also, the merchandise reading apparatus 10 extracts the feature data indicating features of the captured merchandise based on the captured image. The merchandise reading apparatus 10 calculates degrees of similarity by comparing the extracted feature data with the feature data of a plurality of reference merchandise items stored in a merchandise master table 142, and extracts one or more reference merchandise items corresponding to the captured merchandise as merchandise candidates. This series of processings is called a generic object recognition processing. Various recognition techniques for generic object recognition are described in the following:

Keiji Yanai, "The current State and Future Directions on Generic Object Recognition", journal of information processing society of Japan, Vol. 48, No. SIG16 [searched in 24 Jan. 2013], at http://mm.cs.uec.ac.jp/IPSJ-TCVIM-Yanai.pdf.

The reference merchandise refers to a merchandise item which is being sold in a store with various details being stored in the merchandise master table 142 to be described later. In addition, the reference merchandise serves as a reference for calculating a degree of similarity with respect to the captured merchandise. A reference merchandise having the highest degree of similarity with respect to the captured merchandise is identified as being the captured merchandise. In addition, among the reference merchandise items displayed as the candidates, the reference merchandise selected by an operator is identified as being the captured merchandise.

If the reference merchandise having a particularly high degree of similarity (for example, degree of similarity 95% or more) is present, the merchandise reading apparatus 10 automatically confirms that the reference merchandise having the high degree of similarity is the captured merchandise. The merchandise reading apparatus 10 reads a merchandise ID that specifies the automatically confirmed reference merchandise from the merchandise master table 142 (refer to FIG. 2). Also, the merchandise reading apparatus 10 transmits the read merchandise ID to the POS terminal 30.

Meanwhile, if no reference merchandise is identified as having a degree of similarity which is high enough to be automatically confirmed, the merchandise reading apparatus 10 displays a certain number of reference merchandise items in descending order of the degrees of similarity calculated by the generic object recognition (for example, four in descending order from the reference merchandise having the highest degree of similarity) on the display unit for operator 22 as candidates. The operator operates a touch panel 25, and selects the reference merchandise, out of the number of reference merchandise items, that corresponds to the captured merchandise. The merchandise reading apparatus 10 reads the merchandise ID for specifying the selected reference merchandise from the merchandise master table 142. Also, the merchandise reading apparatus 10 transmits the read merchandise ID to the POS terminal 30.

The POS terminal 30 is positioned on an upper surface of a drawer 41 on a check-out table 51 which is arranged in an L shape with the counter table 151. The drawer 41 stores money (paper money and coins) deposited from the customer in a cash box. The drawer 41 also stores change provided to the customer. When the drawer 41 receives a signal of an opening operation from the POS terminal 30, the cash box is opened.

In the POS terminal 30, the operating unit 42 that is operated by the operator is arranged on an upper surface. When seen from the operator who operates the operating unit 42, the operator display unit 43, which displays information for the operator, is provided closer than the operating unit 42. The operator display unit 43 displays information with respect to the operator. The touch panel 46 overlays a display surface 43a of the operator display unit 43. When seen from the customer, the customer display unit 44 is provided to be rotatably mounted at a position closer than the operator display unit 43. The customer display unit 44 displays information with respect to the customer.

The POS terminal 30 reads the merchandise information from a merchandise master table 342 (refer to FIG. 4) based on the merchandise ID received from the merchandise reading apparatus 10, and executes a sales registration processing of the merchandise. The sales registration processing includes displaying a merchandise name or a cost (collectively, so called merchandise information) of the merchandise based on the merchandise ID, and storing the merchandise information in a merchandise information unit 331 (refer to FIG. 4). The operator operates the temporary settlement key 211 after the sales registration processing is repeatedly performed on all merchandise items P stored in the first shopping basket 153a.

When a settlement key 421 (refer to FIG. 4) in the POS terminal 30 is operated after the temporary settlement key 211 is operated, the POS terminal 30 executes a payment processing with respect to the sales-registration processed merchandise. The payment processing includes calculating and displaying changes, instructing a change machine to issue the change, issuing a receipt on which the merchandise information or payment information (total amount of money, deposit amount, changes amount, and the like) is printed, and the like. Moreover, a processing in which the sales registration processing and the payment processing are combined is called a transaction processing. In addition, the transaction-processed information is called sales information.

Figure 2:
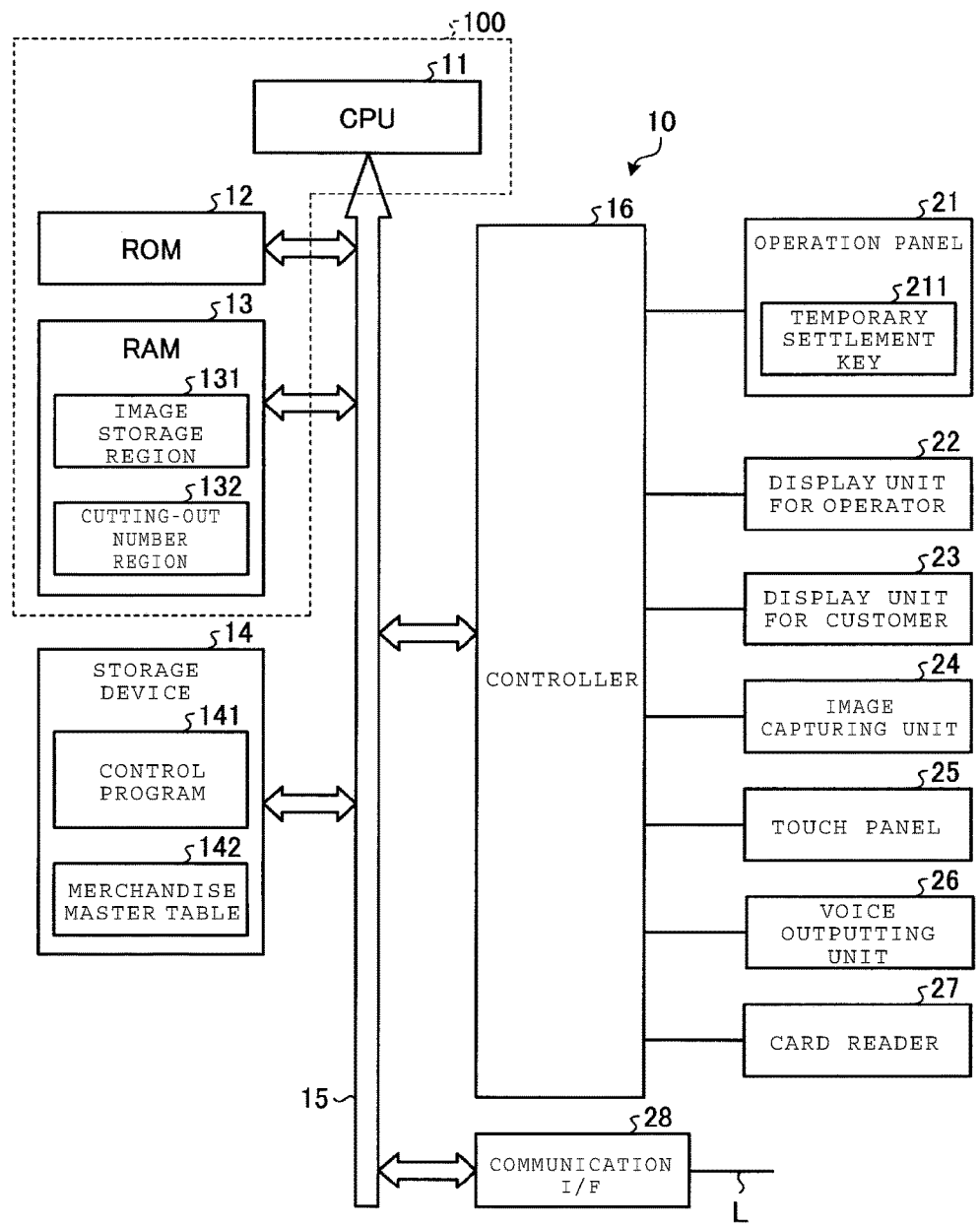
FIG. 2 is a block diagram showing an example hardware configuration of the merchandise reading apparatus.

Next, an example hardware configuration of the merchandise reading apparatus 10 will be described with reference to the block diagram of FIG. 2. As shown in FIG. 2, the merchandise reading apparatus 10 includes a central processing unit (CPU) 11 which functions as a main controller. The merchandise reading apparatus 10 also includes a read only memory (ROM) 12 storing various programs. In addition, the merchandise reading apparatus 10 includes a random access memory (RAM) 13 which functions as a work area of the CPU 11. Also, the merchandise reading apparatus 10 includes the storage device 14, and the like which is configured with a HDD or a flash memory, and the like for storing various programs. The CPU 11, the ROM 12, the RAM 13, and the storage device 14 are connected to each other through a data bus 15.

The CPU 11, the ROM 12, and the RAM 13 are configured as a control unit 100. The control unit 100 executes a control processing to be described later when the CPU 11 is operated in accordance with the control program developed in the RAM 13 stored in a control program unit 141 of the storage device 14.

The RAM 13 also stores various data. RAM 13 includes an image storing region 131 and a cutting-out number storage region 132. The image storing region 131 stores an image including the merchandise which is captured by the image capturing unit 24 to be described later. The cutting-out number storage region 132 stores a cutting-out number of each merchandise cut-out from the captured image. Cutting out of the merchandise means that a contour of the merchandise is recognized in the captured image and an image of the corresponding merchandise is extracted from the captured image.

The storage device 14 has stored therein a control program 141 and a merchandise master table 142. The control program 141 is a program for controlling the merchandise reading apparatus 10. The merchandise master table 142 (to be described later in FIG. 3) stores various information relating to each reference merchandise. In addition, the merchandise master table 142 stores the feature data which indicates a feature of the merchandise, in correspondence with each merchandise ID specifying the reference merchandise. The feature data indicates features of the merchandise such as colors or patterns of a surface of the merchandise, shapes, and unevenness states. Also, in the embodiment, the merchandise master table 142 stores the feature data of the merchandise, however, a dictionary storing the feature data of the merchandise may be provided for each separate merchandise ID, and the corresponding merchandise ID may be related to the merchandise ID stored in the merchandise master table 142.

The control unit 100 is connected to the operation panel 21, the operator display unit 22, the customer display unit 23, the image capturing unit 24, the touch panel 25, a voice outputting unit 26, and the card reader 27 through the data bus 15 and the controller 16. In addition, the control unit 100 is connected to a communication interface (I/F) 28 through the data bus 15. The communication I/F 28 is connected to the POS terminal 30 through a communication line L.

The image capturing unit 24 includes a color CCD sensor or a color CMOS sensor. The image capturing unit 24 captures an image including merchandise passing through a front of the reading window 24a. The voice outputting unit 26 is a voice circuit, a speaker, and the like for generating warning sound set in advance, or the like. The voice outputting unit 26 provides notifications such as warning sound under the control of the control unit 100. The card reader 27 reads card information from a card scanned through the groove 27a.

Next, using FIG. 3, an example configuration of the merchandise master table 142 is described. The merchandise master table 142 stores a merchandise name, a unit price, a merchandise image, and feature data of the reference merchandise by corresponding to the merchandise ID specifying the reference merchandise. As illustrated in FIG. 3, the merchandise master table 142 includes: merchandise ID unit 1421, merchandise name column 1423, unit price column 1424, merchandise image unit 1425, and feature data column 1426.

The merchandise ID column 1421 stores the merchandise ID specifying the reference merchandise. The merchandise name column 1423 stores the merchandise name of the reference merchandise specified by the merchandise ID. The unit price column 1424 stores a unit price of the reference merchandise being specified by the merchandise ID. The merchandise image column 1425 stores a representative image indicating features of the reference merchandise specified by the merchandise ID. The feature data unit corresponds to the merchandise ID stored in the merchandise ID column 1421, and stores the feature data indicating a feature of the reference merchandise.

Figure 4:
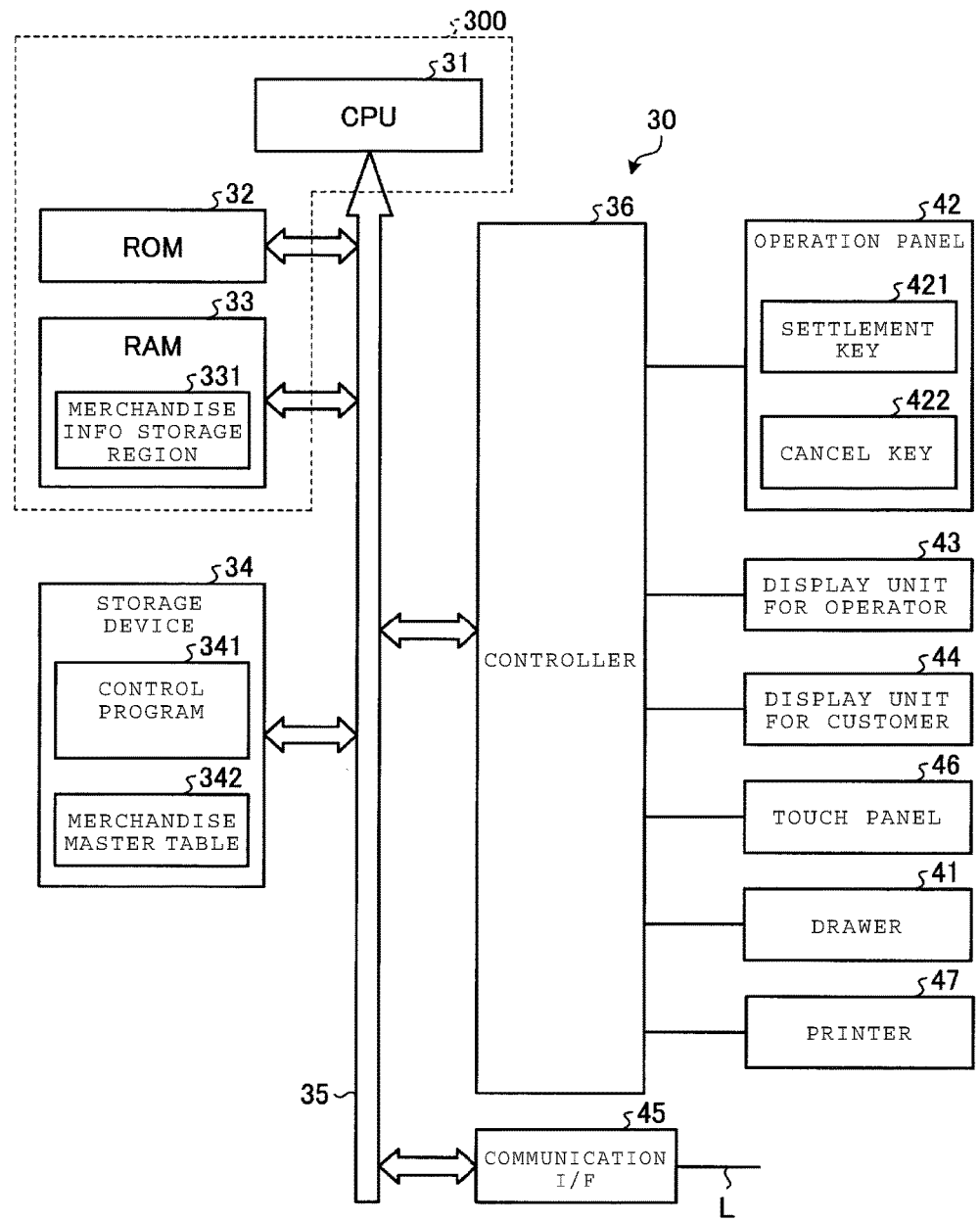
FIG. 4 is a block diagram showing an example hardware configuration of a POS terminal.

Next, an example hardware configuration of the POS terminal 30 will be described using the block diagram of FIG. 4. As illustrated in FIG. 4, the POS terminal 30 includes a CPU 31, which is a main controller. The POS terminal 30 includes a ROM 32 which stores various programs. The POS terminal 30 includes a RAM 33 which functions as a work area of the CPU 31. In addition, the POS terminal 30 includes a storage device 34 which is configured with a HDD and/or a flash memory, or the like for storing various programs, and the like. The CPU 31, the ROM 32, the RAM 33, and the storage device 34 are connected to each other through a data bus 35.

The CPU 31, the ROM 32, and the RAM 33 are configured as a control unit 300. The control unit 300 executes a control processing to be described later when the CPU 31 is operated according to a control program developed by the RAM 33, which is stored in a control program unit 341 of the storage device 34.

The RAM 33 also stores various data. The RAM 33 includes a merchandise information unit 331. The merchandise information unit 331 stores merchandise information of merchandise for which the sales registration processing is performed by the POS terminal 30.

The storage device 34 has stored therein a control program 341 and the merchandise master table 342. The control program 341 is a program controlling the POS terminal 30. The merchandise master table 342 has essentially the same structure as that of the merchandise master table 142 of the merchandise reading apparatus 10. Since the sales registration processing of additional merchandise or a cancel processing may be executed, the POS terminal 30 itself stores the merchandise master table 342. In addition, since the generic object recognition processing may be executed based on an image captured by the merchandise reading apparatus 10, the POS terminal 30 itself stores the merchandise master table 342.

The control unit 300 is connected to the operating unit 42 provided with the settlement key 421 and a cancel key 422, the operator display unit 43, the customer display unit 44, the touch panel 46, the drawer 41, and a printer 47 through the data bus 35 and the controller 36. The settlement key 421 is operated when the payment processing of transaction is executed. The cancel key 422 is operated to delete, from the merchandise information unit 331, the merchandise information for which the sales registration processing was previously performed. If the cancel key 422 is operated, the merchandise information of the merchandise on which the sales registration processing is performed immediately before is deleted, and the sales registration processing relating to the merchandise is nullified. In addition, the communication I/F 45 is connected to the control unit 300 through the data bus 35, and the communication I/F 45 is connected to the merchandise reading apparatus 10 through the communication line L.

Figure 5:
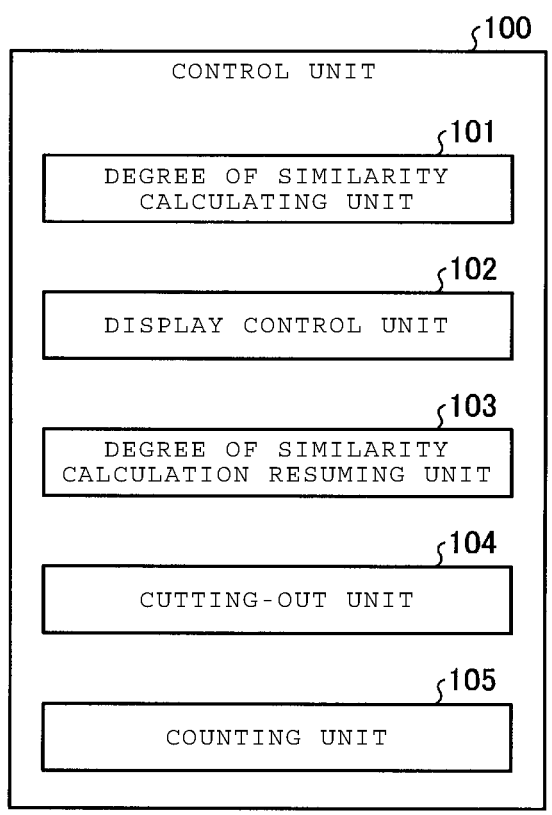
FIG. 5 is a functional block diagram showing an example functional configuration of the merchandise reading apparatus.

Hereinafter, a control processing of the merchandise reading apparatus 10 and the POS terminal 30 will be described. FIG. 5 is a functional block diagram showing an example functional configuration of the merchandise reading apparatus 10. The control unit 100 functions as a degree of similarity calculating unit 101, a display control unit 102, a degree of similarity calculation resuming unit 103, a cutting-out unit 104, and a counting unit 105, in accordance with the control program 141 stored in the storage device 14 and executed by CPU 11. The algorithm for each of the functional units is further described below.

The degree of similarity calculating unit 101 calculates the degrees of similarity of the reference merchandises with respect to the captured merchandise, based on the feature data indicating features of the reference merchandises stored in the merchandise master table 142.

The display control unit 102 carries out a process to display, on a display unit, the plural reference merchandise items having high degrees of similarity which are calculated as candidates of the merchandise.

The degree of similarity calculation resuming unit 103 automatically resumes calculation of the degrees of similarity with respect to a newly captured merchandise using the degree of similarity calculating unit 101, if no reference merchandise is selected from the plural reference merchandise items displayed on the operator display unit 22 after a predetermined time elapses.

The cutting-out unit 104 performs cutting-out an image of merchandise from the captured image which is captured by the image capturing unit 24.

The counting unit 105 counts a number of times images of merchandise are cut by the cutting-out unit 104.

Figure 6:
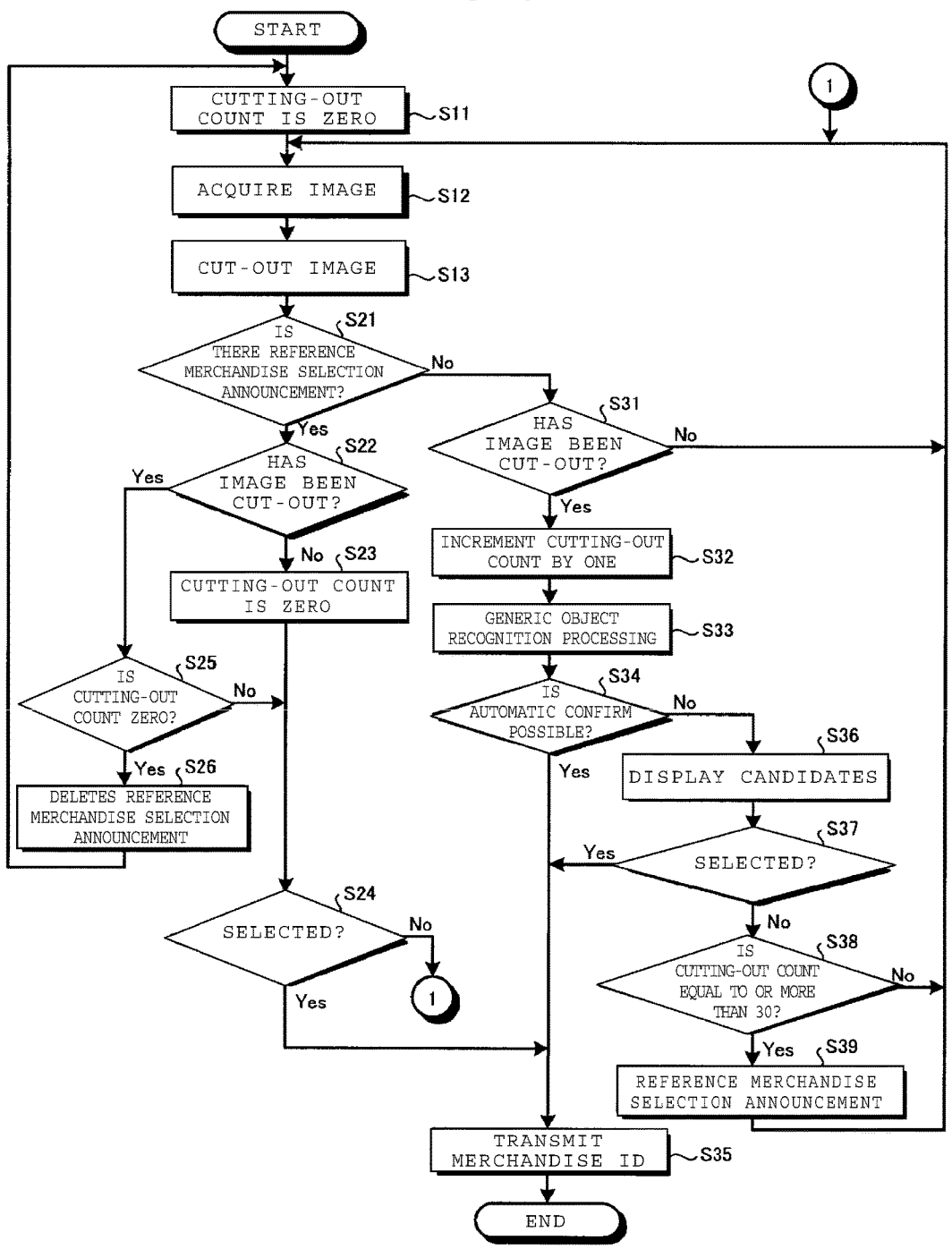
FIG. 6 is a flowchart showing an example flow of a control processing of the merchandise reading apparatus.

FIG. 6 is a flowchart showing an example flow of a control processing of the merchandise reading apparatus 10. As illustrated in FIG. 6, the control unit 100 stores a numerical value "0" as a cutting-out count in the cutting-out number storage region 132 (S11). The operator holds the merchandise over a front of the image capturing unit 24. Then, the control unit 100 acquires the captured image which is captured by the image capturing unit 24 (S12). The control unit 100 (in particular, the cutting-out unit 104) cuts-out the image of the merchandise, if any, from the captured image (S13).

Next, the control unit 100 determines whether or not a message with instructions to select one of the displayed candidate reference merchandise items is currently displayed on the operator display unit 22 (via by a processing in S39 to be described later) (S21). If it is determined that the message with instructions to select one of the reference merchandise items is not currently displayed (No at S21), the control unit 100 determines whether or not the image of the merchandise has been cut-out (S31). If it is determined that the image of the merchandise has been cut-out (Yes at S31), the control unit 100 (in particular, the counting unit 105) increments a cutting-out count stored in the cutting-out number storage region 132 by one (S32).

Next, the control unit 100 (in particular, the degree of similarity calculating unit 101) executes the generic object recognition processing based on the image cut-out in the processing of S13 (S33). That is, the control unit 100 extracts the feature data from the cut-out image in the processing of S13. Also, the control unit 100 compares the extracted feature data with the feature data of the reference merchandise stored in the feature data column 1426. The control unit 100 extracts the reference merchandise having similar feature data. The control unit 100 calculates degrees of similarity between the cut-out merchandise and the extracted reference merchandises.

Next, the control unit 100 determines whether or not the cut-out merchandise is automatically identified as corresponding to one specific merchandise based on the calculated degrees of similarity (S34). In this determination, it is determined whether or not a reference merchandise having a particularly high calculated degree of similarity (for example, degree of similarity of 95% or more) is present. If a reference merchandise having the particularly high calculated degree of similarity is present, it is determined that such a reference merchandise can be automatically confirmed to be the cut-out merchandise. If a reference merchandise having the particularly high calculated degree of similarity is not present, it is determined that the cut-out merchandise cannot be automatically confirmed to be any one specific merchandise.

If it is determined that the reference merchandise can be automatically confirmed (Yes at S34), the control unit 100 reads the merchandise ID of the reference merchandise which is automatically confirmed from the merchandise master table 142, and transmits the read merchandise ID to the POS terminal 30 (S35). If it is determined that the reference merchandise cannot be automatically confirmed (No at S34), the control unit 100 (in particular, the display control unit 102) causes the operator display unit 22 to display the one or more reference merchandise items having high degrees of similarity calculated in S33, as the candidates of the cut-out merchandise (S36). For example, the control unit 100 causes the display unit to display the number of merchandise items (for example, four) in descending order of the degree of similarity.

If the operator determines that the merchandise held over the image capturing unit 24 is present among the reference merchandise items displayed on the display unit for operator 22, the operator operates the touch panel 25 and selects the reference merchandise that corresponds to the captured merchandise. The control unit 100 determines whether or not a reference merchandise is selected (S37). If it is determined that a reference merchandise is selected (Yes at S37), the control unit 100 executes the processing of S35. Meanwhile, if it is determined that no reference merchandise is selected (No at S37), the control unit 100 determines whether or not a cutting-out count stored in the cutting-out number storage region 132 is equal to or more a predetermined value (for example, 30) (S38). If it is determined that the cutting-out count is less than the predetermined value (No at S38), the control unit 100 returns to S12, acquires a new image, and attempts to cut-out again. Meanwhile, if it is determined that the cutting-out count is equal to or more than a predetermined value (Yes at S38), the control unit 100 carries out a process to display on the operator display unit 22 the message with instructions to select one reference merchandise from the reference merchandise items displayed as the candidates (S39). Then, the control unit 100 returns to S12.

Figure 7:
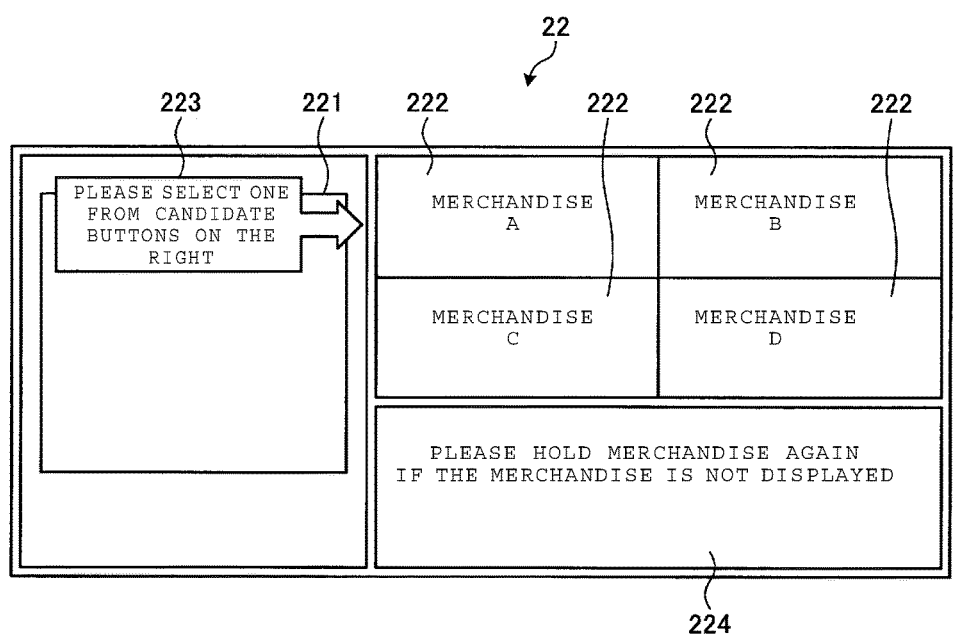
FIG. 7 illustrates an example of a screen displayed by the merchandise reading apparatus.

FIG. 7 is a view showing an example of a screen in which the control unit 100 carries out a process to display on the operator display unit 22 the message with instructions to select a reference merchandise from the reference merchandises displayed as the candidates in S39. In FIG. 7, the control unit 100 carries out a process to display an image display area 221 and a candidate merchandise area 222 on the operator display unit 22. The image display area 221 displays the captured image which is captured by the image capturing unit 24. The candidate merchandise area 222 displays merchandise information (merchandise name, price, image of merchandise, and the like) of the reference merchandise items acquired from the merchandise master table 142 (see S36). In the example of FIG. 7, merchandise information for merchandise item A, merchandise item B, merchandise item C, and merchandise item D are displayed. The operator touches the reference merchandise which he/she determines to correspond to the captured merchandise from among the displayed reference merchandise items to thereby select the one reference merchandise.

In addition, the control unit 100 displays an announcement 223 instructing the operator to select one reference merchandise from the displayed reference merchandise items. In addition, in order to deal with a case in which the merchandise which is being held is not displayed as one of the candidate reference items on the candidate merchandise area 222, the control unit 100 displays an announcement 224 to urge the operator to hold the merchandise over the image capturing unit 24 again. The announcement 224 is also displayed in S39. In addition, if it is determined in S31 that an image of the merchandise has not been cut-out in the processing of S13 (No at S31), the control unit 100 returns to S12.

Meanwhile, if it is determined in S21 that announcement 223 is displayed (Yes at S21), the control unit 100 determines whether or not an image of the merchandise has been cut-out in the processing of S13 (S22). Moreover, in the embodiment, a timing of determination whether or not an image of the merchandise has been cut-out corresponds to a predetermined length of time. If it is determined that an image of the merchandise has not been cut-out within the predetermined length of time (No at S22), the control unit 100 sets a value of the cutting-out count stored in the cutting-out number storage region 132 to "0" (S23). Also, the control unit 100 determines whether or not one reference merchandise is selected from the reference merchandise items displayed in S36 (S24). If it is determined that one reference merchandise is selected (Yes at S24), the control unit 100 executes the processing of S35. In addition, if it is determined that no reference merchandise is selected (No at S24), the control unit 100 returns to S12.

In addition, if the operator does not operate anything after the announcement 223 and the announcement 224 are displayed in S39, the control unit 100 enters awaiting state, that is, determines No in S22, determines No in S24, and returns to S12. If one reference merchandise is selected during the waiting state, the control unit 100 determines Yes in S24. In addition, if an image is cut-out during the waiting state, the control unit 100 determines Yes in S22.

In addition, if it is determined in S22 that an image of the merchandise is cut-out (Yes at S22), the control unit 100 determines whether or not the value of the cutting-out count stored in the cutting-out number storage region 132 is "0" (S25). If the value of the cutting-out count is determined to be "0" (Yes at S25), the control unit 100 deletes the announcement 223 with the instructions to select one of the reference merchandises (S26). Then, the control unit 100 returns to S11 to restart the control processing of the merchandise reading apparatus 10.

That is, if the control unit 110 determines in S22 that a new image has been cut out in a state in which no reference merchandise is selected from the reference merchandises displayed as the candidates after the announcement 223 is displayed in S39 (and the cutting-out count has been reset to zero), the control unit 100 deletes the announcement 223, which is displayed in S39, in the processing of S26 and returns to S11. Also, the control unit 100 automatically resumes determination of the degrees of similarity with respect to the image of the merchandise which is newly cut-out in S33. This series of processings corresponds to the degree of similarity calculation resuming unit 103.

In addition, if the value of the cutting-out count is determined not to be "0" (No at S25), the control unit 100 executes the processing of S24.

Figure 8:
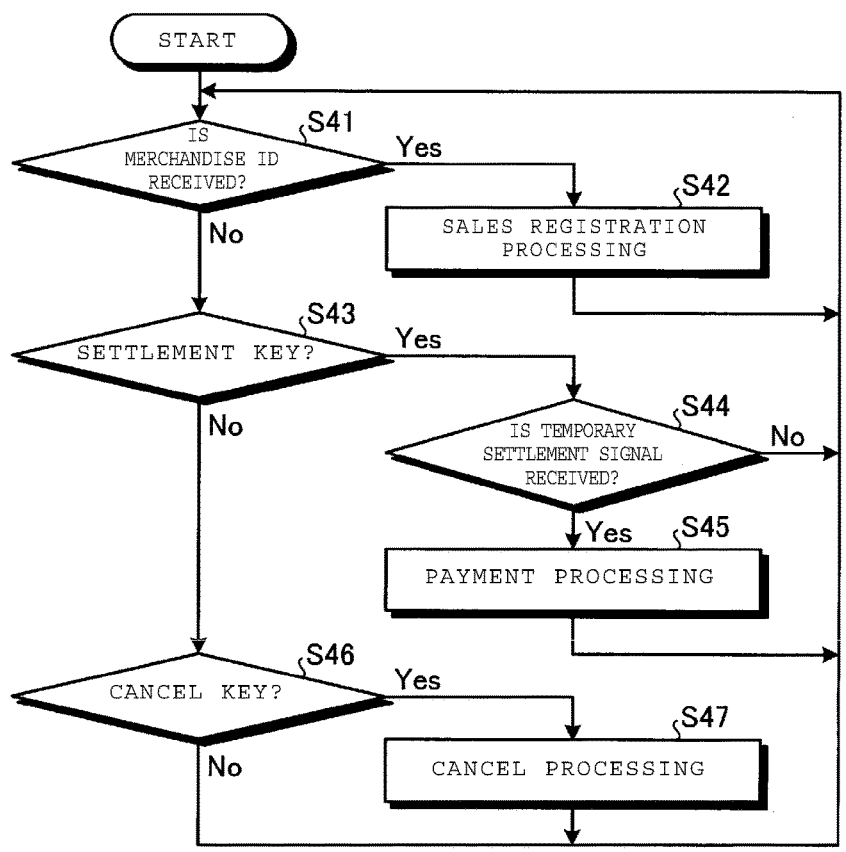
FIG. 8 is a flowchart showing an example flow of a control processing of the POS terminal.

Hereinafter, a control processing of the POS terminal 30 will be described. FIG. 8 is a flowchart showing an example flow of the control processing of the POS terminal 30. In FIG. 8, the control unit 300 determines whether or not the merchandise ID is received from the merchandise reading apparatus 10 (S41). If it is determined that the merchandise ID is received (Yes at S41), the control unit 100 searches the merchandise master table 342 based on the received merchandise ID and acquires merchandise information relating to the merchandise. Also, the control unit 300 executes a merchandise registration processing of the merchandise based on the acquired merchandise information (S42). That is, the POS terminal 30 automatically executes the sales registration processing based on the received merchandise ID. Then, the control unit 300 returns to S41.

In addition, if it is determined that the merchandise ID is not received (No at S41), the control unit 300 determines whether or not the settlement key 421 is operated (S43). If it is determined that the settlement key 421 is operated (Yes at S43), the control unit 300 determines whether or not a temporary settlement signal is received from the merchandise reading apparatus 10 (S44). If it is determined that the temporary settlement signal is received (Yes at S44), the control unit 300 executes the payment processing relating to transaction based on the merchandise information stored in the merchandise information unit 331 (S45). Then, the control unit 300 returns to S41. If it is determined that the temporary settlement signal is not received (No at S44), the control unit 300 returns to S41.

In addition, if it is determined that the settlement key 421 is not operated (No at S43), the control unit 300 determines whether or not the cancel key 422 is operated (S46). If it is determined that the cancel key 422 is operated (Yes at S46), the control unit 300 executes the cancel processing to delete the merchandise information of the merchandise which is previously subjected to the sales registration processing from the merchandise information stored in the merchandise information unit 331 (S47). In this way, the control unit 300 cancels the sales registration processing of the merchandise which was previously subjected to the sales registration processing. Then, the control unit 300 returns to S41. Also, if it is determined that the cancel key 422 is not operated (No at S46), the control unit 300 returns to S41.

According to such an embodiment, the control unit 100 automatically resumes determination of the degrees of similarity with respect to a newly cut-out image at a predetermined timing at which the operator selects no reference merchandise from the reference merchandises displayed as the candidates and the newly captured image is cut-out. Therefore, if the merchandise of interest is not included in the displayed reference merchandises, calculation of the degrees of similarity with respect to the newly captured merchandise can be automatically resumed.

Figure 9:
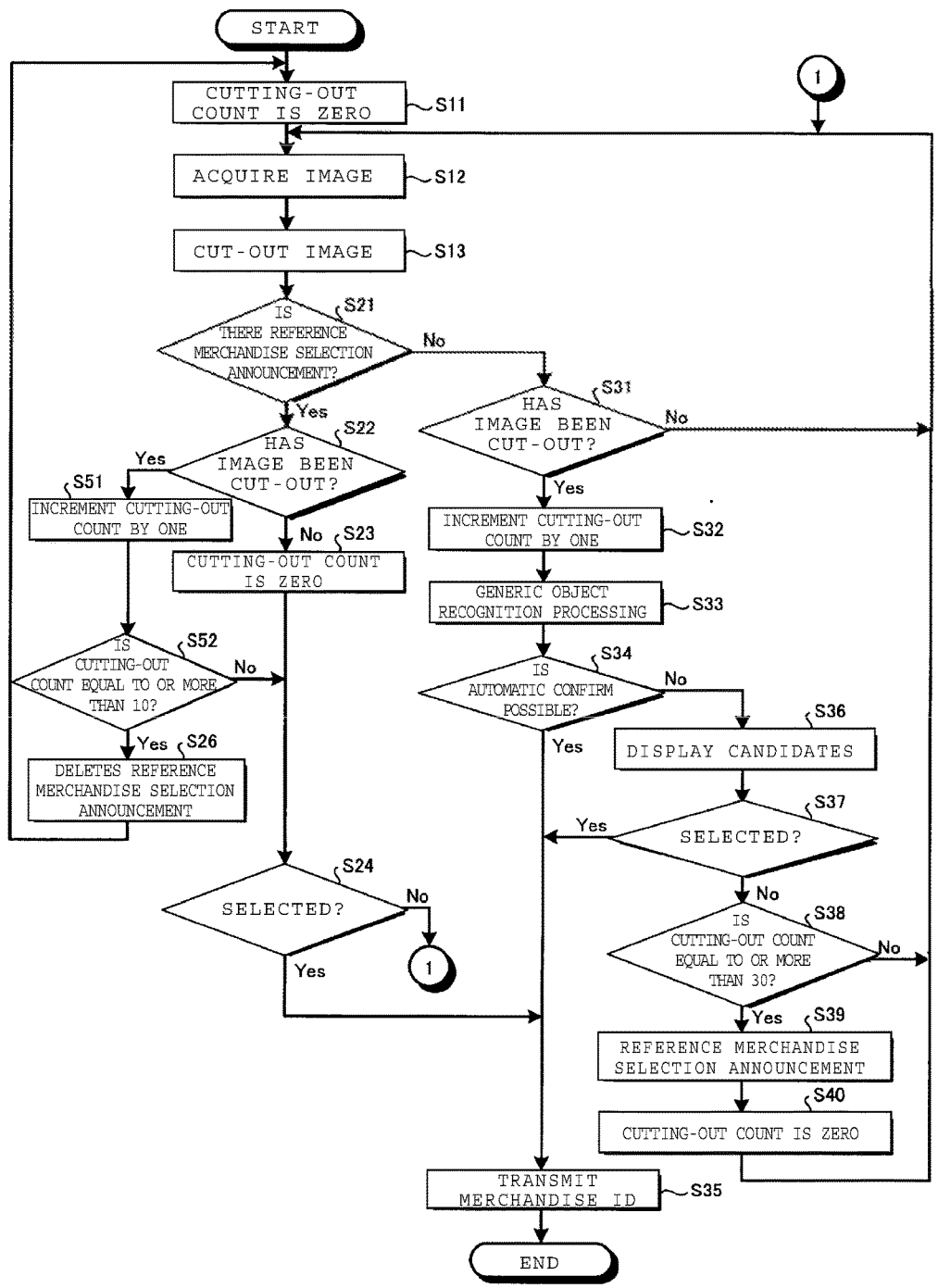
FIG. 9 is a flowchart showing an example flow of a control processing of a merchandise reading apparatus according to a first modification example.

Hereinafter, a modification example of the embodiment will be described. FIG. 9 is a flow chart showing a first modification example of the embodiment shown in FIG. 6. In the first modification example, determination of degrees of similarity with respect to an image of merchandise which is newly cut-out is automatically resumed at a predetermined timing at which an image is continuously cut out a predetermined number of times (for example, 10 times) when no reference merchandise is selected after the announcement 223 is displayed in S39. In the flow chart of FIG. 9, the same numerals are given to the same processings as those of the embodiment of FIG. 6, and description thereof will be omitted.

In FIG. 9, if it is determined that the image is cut-out in S22 (Yes at S22), the control unit 100 increments the count of the cutting-out number storage region 132 (S51). Also, the control unit 100 determines whether or not an image has been continuously cut-out a predetermined number of times (for example, 10 times) (S52). If it is determined that the image has been continuously cut-out the predetermined number of times (Yes at S52), the control unit 100 executes the processing of S26. In addition, if it is determined that the image has not been continuously cut-out the predetermined number of times (No at S52), the control unit 100 executes the processing of S24. In addition, if the announcement 223 urging the operator to select one of the reference merchandises is displayed (based on S39), the control unit 100 sets the cutting-out count of the cutting-out number storage region 132 to zero (S40).

Accordingly, in the first modification example, if no reference merchandise is selected from the reference merchandises displayed as the candidates after the announcement 223 is displayed (based on S39) and if it is determined in S52 that a new image has been continuously cut-out the predetermined number of times, the processing of S26 deletes the announcement 223 displayed based on S39, the processing returns to S11, and determination of the degrees of similarity with respect to the image of the merchandise which is newly cut-out is automatically resumed in S33. A series of the processings corresponds to the degree of similarity calculation resuming unit 103.

Figure 10:
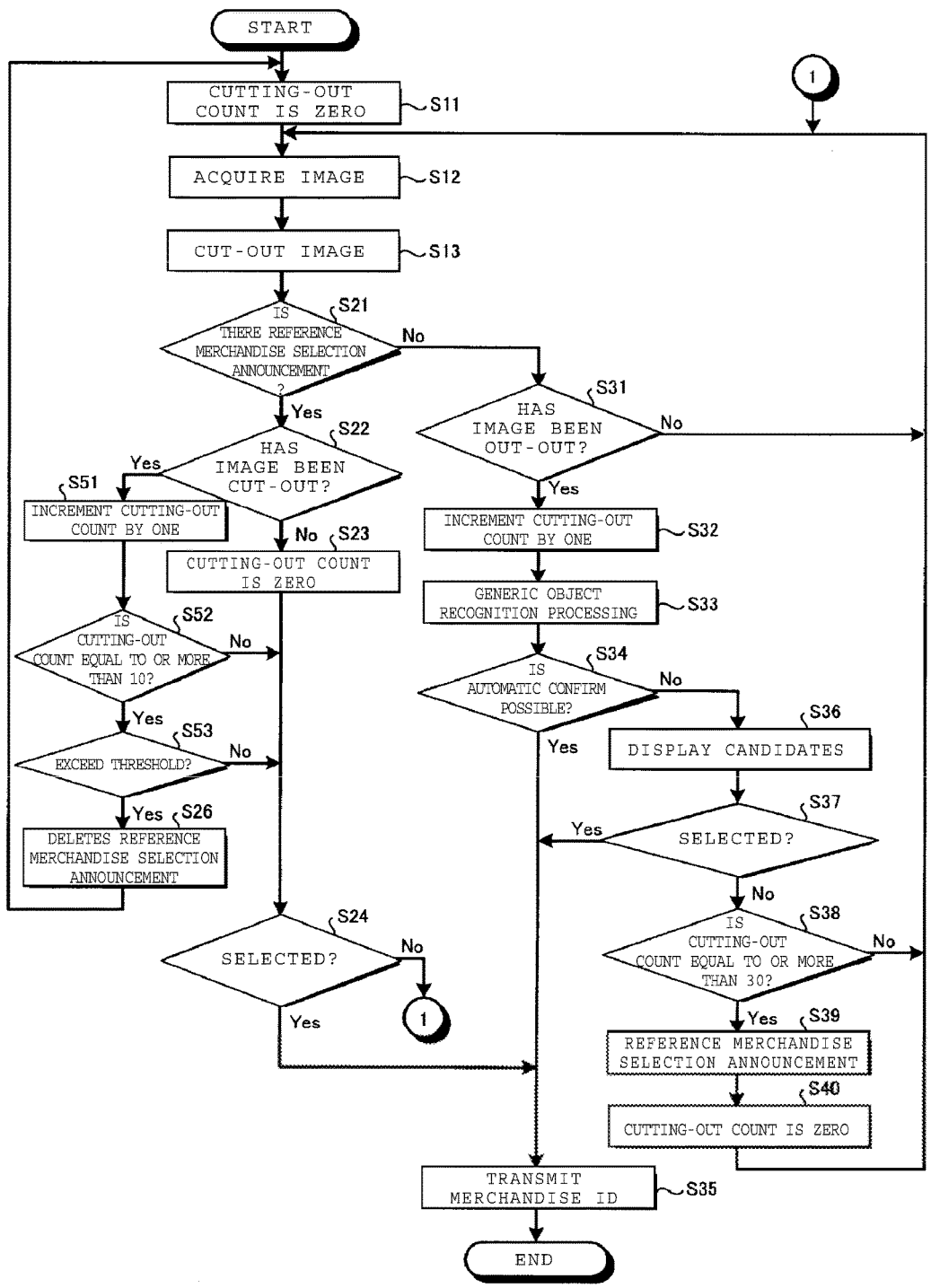
FIG. 10 is a flow chart showing an example flow of a control processing of a merchandise reading apparatus according to a second modification example.

FIG. 10 is a flow chart showing a second modification example of the embodiment shown in FIG. 6. In the second modification example, if an image has been continuously cut-out a predetermined number of times (for example, 10 times) with no reference merchandise being selected after the message instructing to select one of the reference merchandises, i.e., announcement 223, is displayed in S39, determination of the degrees of similarity with respect to an image of a merchandise which is newly cut-out is automatically resumed at a predetermined timing when it is determined that a degree of similarity of the cut-out image is equal to or more than a predetermined threshold. In the flow chart of FIG. 10, the same numerals are given to the same processings as those of the embodiment of FIG. 6, and description thereof will be omitted.

In FIG. 10, the control unit 100 determines whether or not an image has been continuously cut-out the predetermined number of times (S52). If it is determined that an image has been continuously cut-out the predetermined number of times (Yes at S52), the control unit 100 compares feature data of the cut-out image with the feature data stored in the feature data column 1426 to calculate the degrees of similarity. Then, the control unit 100 determines whether or not the calculated degrees of similarity exceed the threshold which is set in advance (S53). The threshold can be set arbitrary. It is preferable that a threshold is set to a high degree of similarity. Also, if it is determined that the degrees of similarity exceed the threshold (Yes at S53), the control unit 100 executes the processing of S26. In addition, if it is determined that the degrees of similarity do not exceed the threshold (No at S53), the control unit 100 executes the processing of S24. In addition, if the announcement 223 is displayed in S39, the control unit 100 sets the cutting-out count of the cutting-out number storage region 132 to zero (S40).

As described above, in the second modification example, if no reference merchandise is selected from the reference merchandise items displayed as the candidates after the announcement 223 is displayed in S39, it is determined in S52 whether a new image has been continuously cut-out the predetermined number of times, and if it is determined in S53 that the degrees of similarity exceed the threshold which is set in advance, the processing of S26 deletes the announcement 223. The processing returns to S11, and determination of the degrees of similarity with respect to the image of the merchandise which is newly cut-out is automatically resumed in S33. A series of processings corresponds to the degree of similarity calculation resuming unit 103.

Figure 11:
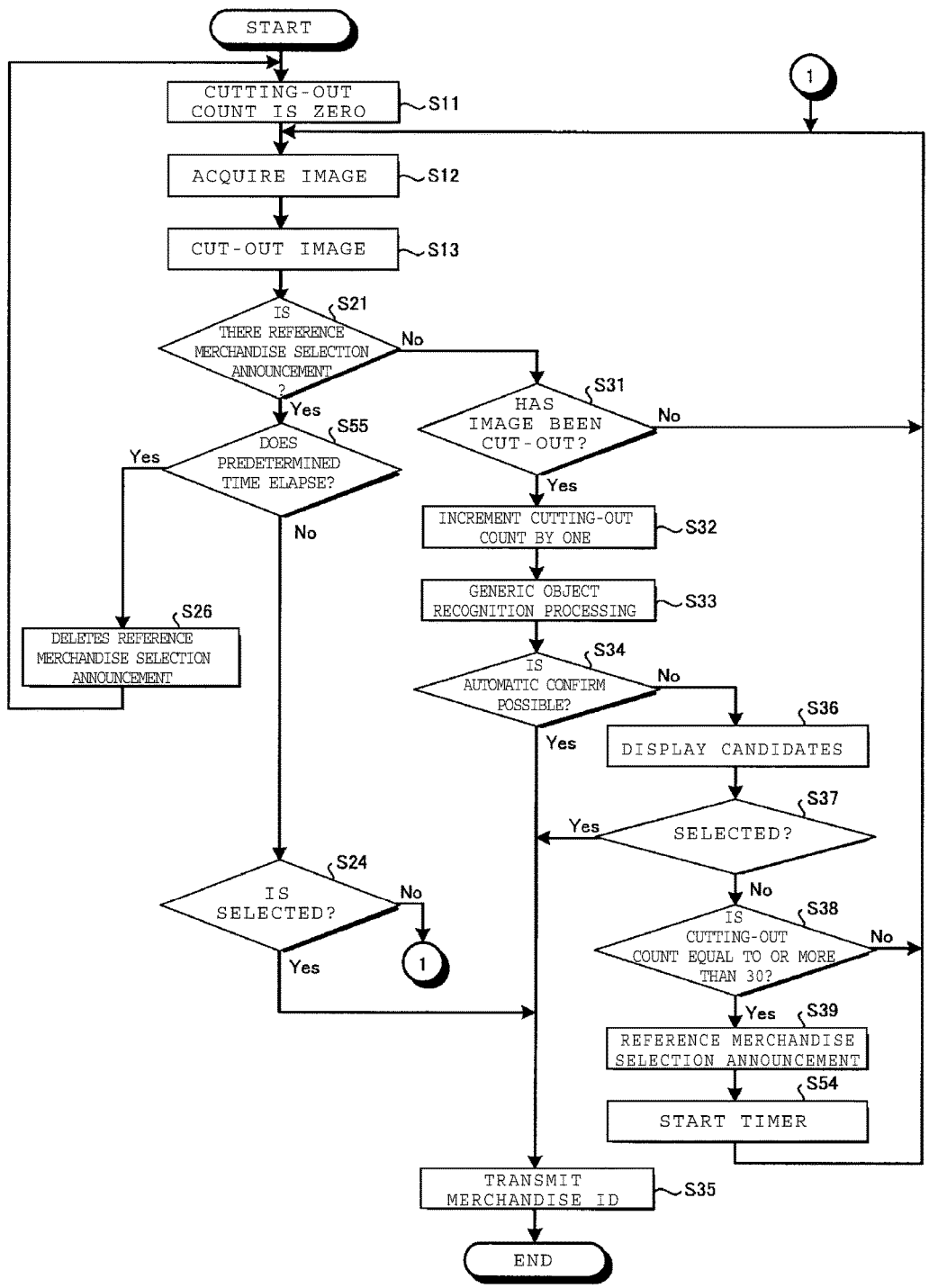
FIG. 11 is a flow chart showing an example flow of a control processing of a merchandise reading apparatus according to a third modification example.

FIG. 11 is a flow chart showing a third modification example of the embodiment shown in FIG. 6. In the third modification example, determination of the degrees of similarity with respect to an image of a merchandise which is newly cut-out is automatically resumed at a predetermined timing at which predetermined time elapses with no reference merchandise being selected after the announcement 223 is displayed in S39. In the flow chart of FIG. 11, the same numerals are given to the same processings as those of the embodiment of FIG. 6, and description thereof will be omitted.

In FIG. 11, if one reference merchandise cannot be automatically confirmed (No at S34), the control unit 100 executes the processings of S36 to S39. Then, the control unit 100 starts a timer (not shown) (S54). Also, if it is determined in S21 that the announcement 223 is displayed (Yes at S21), the control unit 100 determines whether or not the timer shows a predetermined time (S55). If it is determined that the timer shows the predetermined time (Yes at S55), the control unit 100 executes the processing of S26. In addition, if it is determined that the timer does not show the predetermined time (No at S55), the control unit 100 executes the processing of S24. That is, in the third modification example, the processings of S23 and S25 among the processings of the embodiment (processing of flow chart of FIG. 6) are not executed.

As described above, in the third modification example, after plural reference merchandise items which serve as the candidates are displayed in S36, the timer is started in S53, and then, if it is determined in S55 that predetermined time elapses with no reference merchandise being selected from the reference merchandises displayed as the candidates, the process of S26 deletes the announcement 223 displayed in S39, the process returns to S11, and determination of the degrees of similarity with respect to the image of the merchandise which is newly cut-out is automatically resumed in S33. A series of processes corresponds to the degree of similarity calculation resuming unit 103.

Hitherto, while certain embodiments have been described, these embodiments have been presented by way of example only, and are not intended to limit the scope of the exemplary embodiment of the present disclosure. These embodiments described herein can be embodied in a variety of other forms, and various omissions, substitutions and changes in the form of the embodiments described herein may be made without departing from the spirit of the exemplary embodiment of the present disclosure. These embodiments and modifications thereof are included in the scope and gist of the exemplary embodiment of the present disclosure and are included in a range same as the exemplary embodiment of the present disclosure disclosed in claims.

For example, in the embodiment, the merchandise reading apparatus 10 is described as an example of the information processing apparatus. It should be noted that the present disclosure is not limited thereto. The POS terminal 30 may be used as the information processing apparatus. In this case, the merchandise master 342 corresponds to the storing unit. In addition, the POS terminal 30 receives information of the captured image which is captured by the merchandise reading apparatus 10 and executes calculation processing of the degrees of similarity. The display control unit 102 transmits instruction for displaying the merchandise reading apparatus 10 and the merchandise information (for example, merchandise ID) in accordance with a reference article which becomes a candidate, so that the reference article which becomes the candidate is displayed on the merchandise reading apparatus 10. If the displayed reference merchandise is selected, the merchandise reading apparatus 10 transmits the merchandise information (for example, merchandise ID) of the selected reference merchandise to the POS terminal 30.

In addition, in the embodiment, the predetermined timing is set to a timing at which the operator makes no selection with respect to the reference merchandises which are displayed as the candidates and a newly captured image is cut-out. In addition, in the first modification example, the predetermined timing is set to a timing at which an image can be continuously cut-out the predetermined number of times (for example, 10 times) with none of the reference merchandises displayed as the candidates being selected. In addition, in the second modification example, the predetermined timing is set to a timing at which an image can be continuously cut-out the predetermined number of times (for example, 10 times) with none of the reference merchandises displayed as the candidates being selected and it is determined that the degree of similarity of the cut-out image is equal to or more than a predetermined threshold. In addition, in the third modification example, the predetermined timing is set to a timing at which a predetermined time elapses with none of the reference merchandises displayed as the candidates being selected. It should be noted that the predetermined timing is not limited thereto. Arbitrary combination of these predetermined timings may be set to a predetermined timing.

In addition, in the embodiment, both the merchandise reading apparatus 10 and the POS terminal 30 are provided with the merchandise master, but any one of the merchandise reading apparatus 10 and the POS terminal 30 may be provided with the merchandise master.

In addition, in the embodiment, the operator display unit 22 is described as a notification unit, is not limited thereto, and for example, the operator display unit 43 may be used as the notification unit. In addition, the voice outputting unit 26 may be used as the notification unit. In this case, the voice outputting unit 26 notifies the possibility that the symbol is attached as voice.

In addition, in the embodiment, a calculation processing of the degree of similarity by the generic object recognition processing is executed by the merchandise reading apparatus 10, but a part of all of these processing may be executed by the POS terminal 30.

In addition, in the embodiment, the merchandise will be described as an example of the article. However, the article may be an article other than the merchandise.

In addition, in the embodiment, in the check-out system 1 which is configured with the POS terminal 30 and the merchandise reading apparatus 10, the merchandise reading apparatus 10 is described as the information processing apparatus, but is not limited thereto, and one apparatus having the functions of the POS terminal 30 and the merchandise reading apparatus 10 may be used as the information processing apparatus. As the one apparatus having the functions of the POS terminal 30 and the merchandise reading apparatus 10, for example, a self-service check out apparatus which is provided and used at a store such as a supermarket (hereinafter, simply referred to as a self-service POS device) is exemplified.

Figure 12:
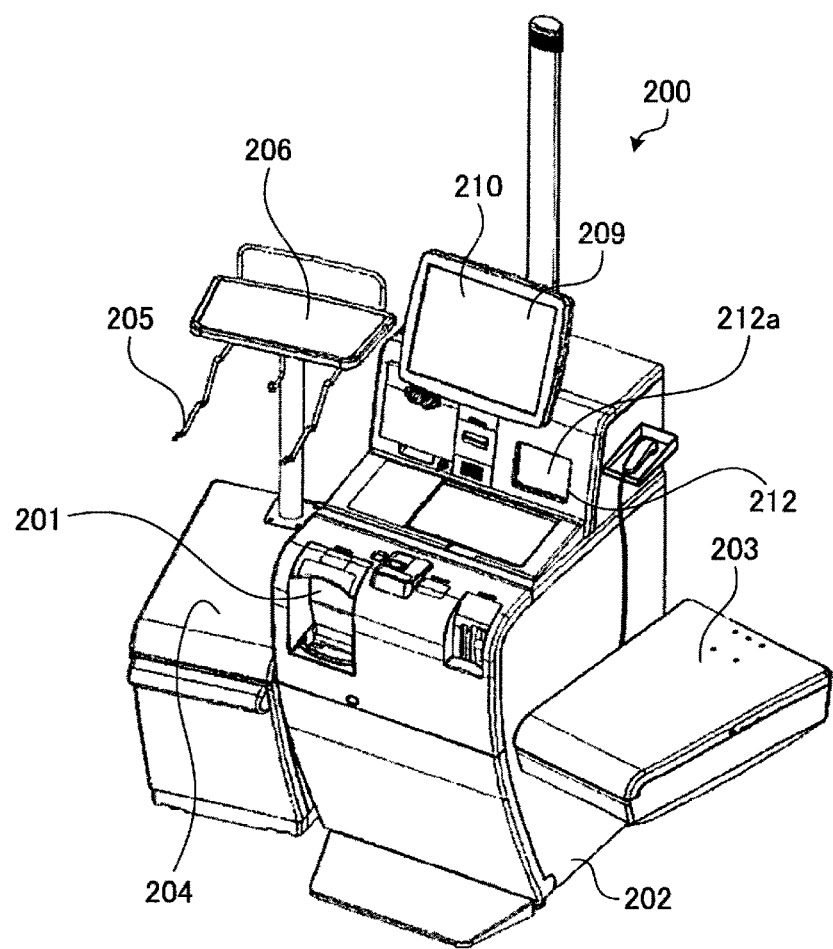
FIG. 12 is a perspective view showing an example configuration of a self-service POS device.
Figure 13:
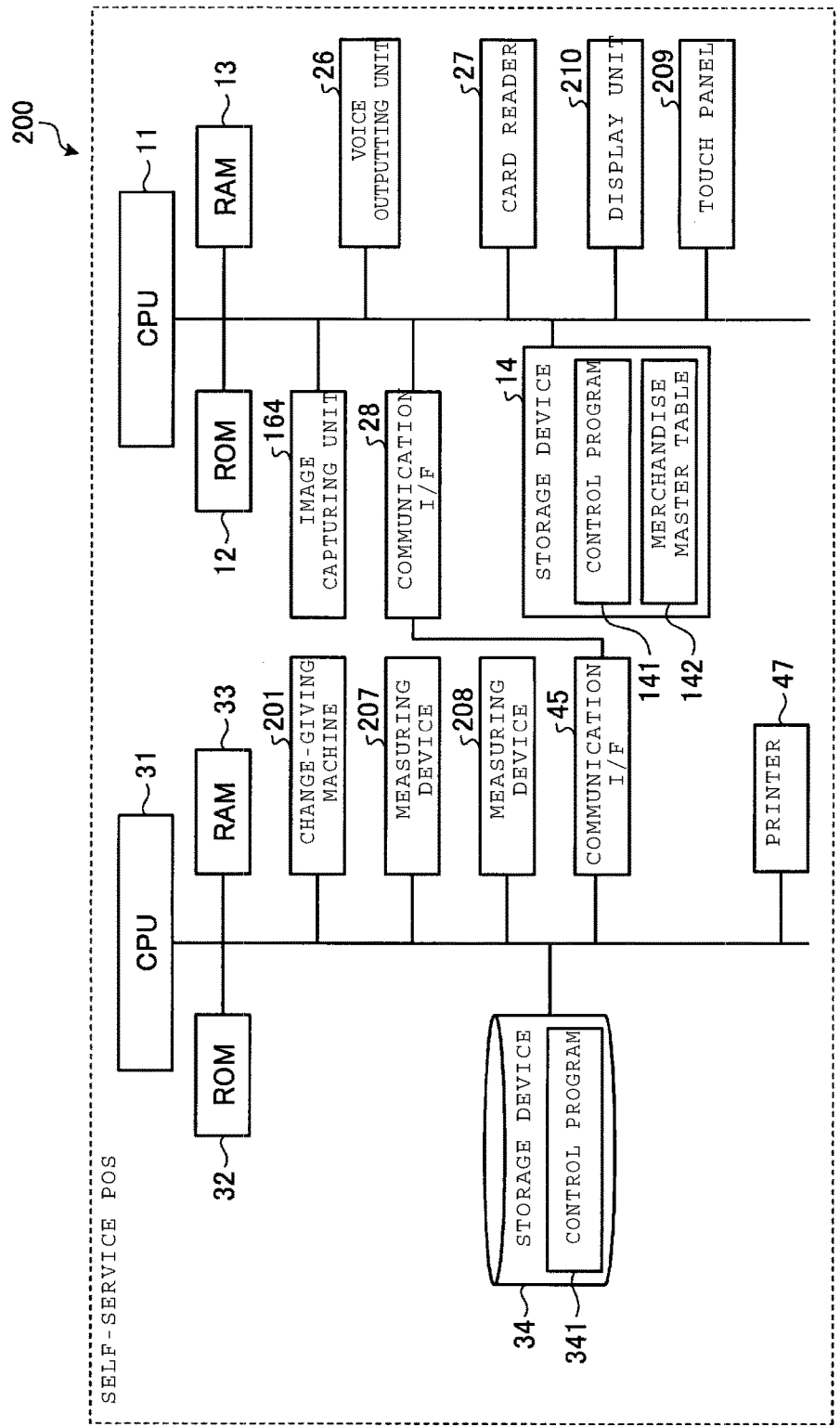
FIG. 13 is a block diagram showing an example hardware configuration of the self-service POS device.

Here, FIG. 12 is a perspective view showing an example configuration of a self-service POS device 200, and FIG. 13 is a block diagram showing an example hardware configuration of the self-service POS device 200. Also, hereinafter, a same numeral is given to the same configuration as that of the configuration shown in FIG. 1 to FIG. 11, and repeated description thereof will be omitted.

As shown in FIG. 12 and FIG. 13, a main body 202 of the self-service POS device 200 is provided with a display unit 210 disposed on a surface of the touch panel 209 or a merchandise reading unit 212 which read a merchandise image in order to recognize the merchandise.

As the display unit 210, for example, a liquid crystal display may be used. The display unit 210 displays a guide screen for informing a customer of an operation method of the self-service POS device 200, various inputting screens, a registration screen displaying the read merchandise information by the merchandise reading unit 212, a check-out screen selecting a payment method, which displays total amounts of money, deposit amounts, change amounts, and the like.

The merchandise reading unit 212 read the merchandise image using the image capturing unit 164 when the customer holds a code symbol attached to the merchandise over the reading window 212a of the merchandise reading unit 212.

In addition, a merchandise placing table 203 for placing a merchandise into a basket, which is not settled yet, is provided on the right side of the main body 202, and a merchandise placing table 204 for placing a merchandise which is settled is provided on the left side of the main body 202. In addition, a bag hook 205 for hooking a bag in order to input the merchandise, which is not settled yet, or a temporary table 206 for temporarily placing the bag before the merchandise, which is not settled yet, is put therein. The merchandise placing tables 203 and 204 are respectively provided with measuring devices 207 and 208, and have a function of confirming that a weight of the merchandise is the same as before and after payment.

In addition, a change-giving machine 201 for depositing bills for settlement or receiving change is installed on the main body 202 of the self-service POS device 200.

If the embodiment of the exemplary embodiment is applied to the self-service POS device 200 including such a configuration, the self-service POS device 200 functions as the information processing apparatus. Moreover, a single apparatus having the functions of the POS terminal 30 and the merchandise reading apparatus 10 is not limited to the self-service POS device 200 described above, and may be an apparatus which is configured without having the measuring devices 207 and 208.

Also, a program for executing the merchandise reading apparatus 10 of the embodiment is provided by being recorded in a recording medium, which can be read by a computer, such as a CD-ROM (DVD), a flexible device (FD), a CD-R, and a digital versatile disk, in an installable type file or an executable format.

In addition, the program being executed by the merchandise reading apparatus 10 of the embodiment may be stored in a computer connected to a network such as Internet, and may be provided by being downloaded through a network. In addition, the programs being executed by the merchandise reading apparatus 10 of the embodiment may be provided and distributed through a network such as Internet.

In addition, a program being executed by the merchandise reading apparatus 10 of the embodiment may be provided in a ROM, or the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object recognition apparatus comprising:
an image capturing unit including an image sensor;
a memory that stores feature data of a plurality of reference objects;
a display; and
a processor configured to
cut out an image of an object from an image captured by the image capturing unit,
calculate degrees of similarity between the object in the cutout image and a plurality of reference objects based on the feature data of the reference objects stored in the memory,
select some of the reference objects as candidate objects based on the calculated degrees of similarity, and
control the display to display the candidate objects and a message to select one of the candidate objects, wherein
if no candidate object displayed on the display is selected within a predetermined time after the candidate objects and the message have been displayed on the display, the processor
resets a cut-out count and, while the message is being displayed, cuts out an image from a newly captured image a preset number of times, and
after the image has been cutout the preset number of times, removes the message and calculates degrees of similarity between an object in another newly captured image and the plurality of reference objects, based on the feature data of the reference objects, the cut-out count being reset also when the processor is unable to cut-out the object in the newly captured image while the message is being displayed.

2. The object recognition apparatus according to claim 1, wherein the processor controls the display to display the candidate objects before displaying the message.

3. The object recognition apparatus according to claim 1, wherein the processor controls the display to display the candidate objects after cutting out the image of the object from the captured image, if none of the degrees of similarity are at or above a threshold degree of similarity.

4. The object recognition apparatus according to claim 3, wherein the processor controls the display to display the candidate objects a predetermined number of times, before controlling the display to display the message.

5. The object recognition apparatus according to claim 1, wherein the preset number of times is one or more.

6. The object recognition apparatus according to claim 1, wherein the preset number of times is greater than one.

7. A non-transitory computer-readable medium comprising instructions for execution on a processor of an object recognition apparatus having an image capturing unit including an image sensor, a memory that stores feature data of a plurality of reference objects, and a display, wherein the instructions cause the processor to perform an object recognition method comprising:
cutting out an image of an object from an image captured by the image capturing unit,
calculating degrees of similarity between the object in the cutout image and a plurality of reference objects, based on the feature data of the reference objects stored in the memory;
selecting some of the reference objects as candidate objects based on the calculated degrees of similarity; and
displaying on the display the candidate objects and a message to select one of the candidate objects, wherein
if no candidate object displayed on the display is selected within a predetermined time after the candidate objects and the message have been displayed on the display, the instructions further cause the processor to
reset a cut-out count and, while the message is being displayed, cutout an image from a newly captured image a preset number of times, and
after the image has been cutout the preset number of times, remove the message and calculate degrees of similarity between an object in another newly captured image and the plurality of reference objects, based on the feature data of the reference objects, the cut-out count being reset also when the processor is unable to cut-out the object in the newly captured image while the message is being displayed.

8. The non-transitory computer-readable medium according to claim 7, wherein the candidate objects are first displayed and the message is displayed thereafter.

9. The non-transitory computer-readable medium according to claim 7, wherein the instructions cause the processor to control the display to display the candidate objects after cutting out the image of the object from the captured image, if none of the degrees of similarity are at or above a threshold degree of similarity.

10. The non-transitory computer-readable medium according to claim 9, wherein the instructions cause the processor to control the display to display the candidate objects a predetermined number of times, before the controlling the display to display the message.

11. The non-transitory computer-readable medium according to claim 7, wherein the preset number of times is one or more.

12. The non-transitory computer-readable medium according to claim 7, wherein the preset number of times is greater than one.

* * * * *